UNITED STATES PATENT OFFICE.

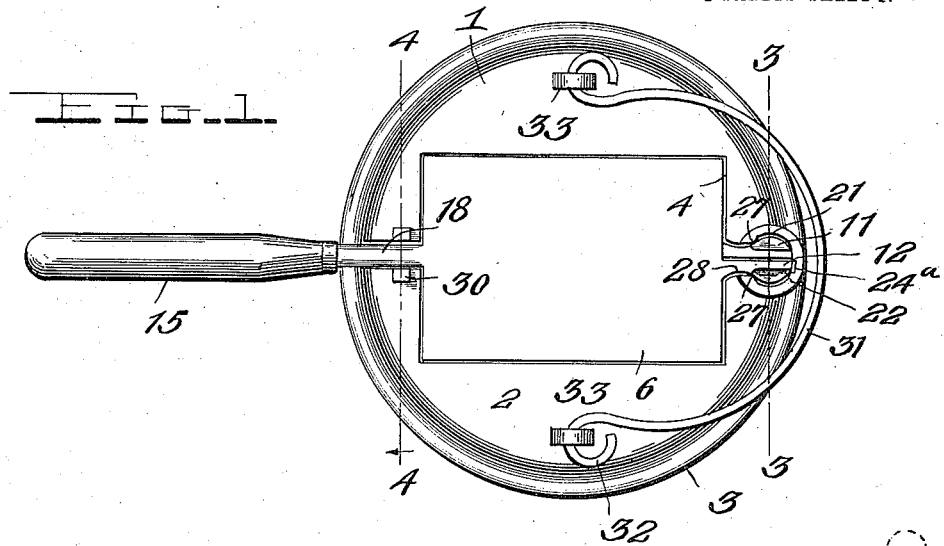
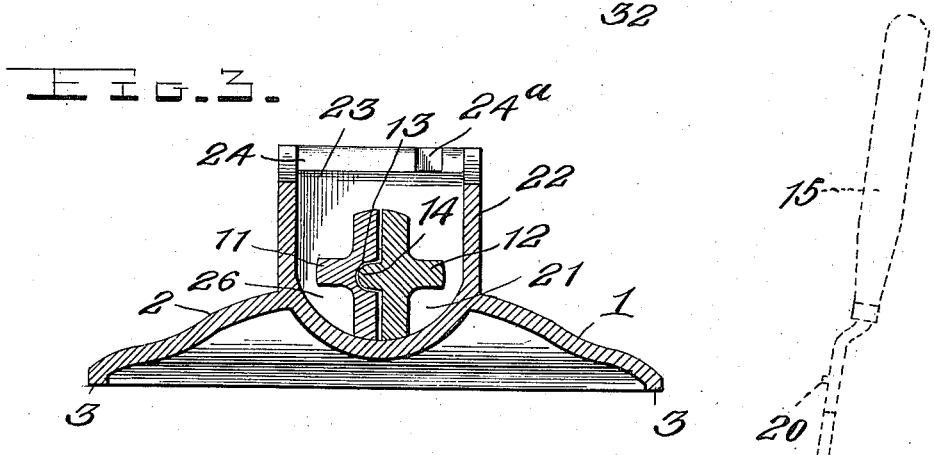
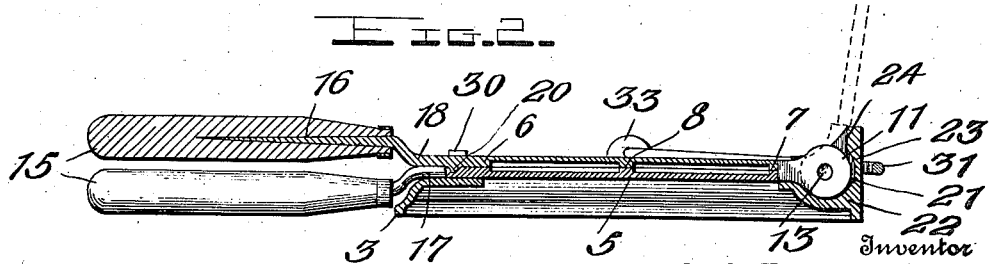

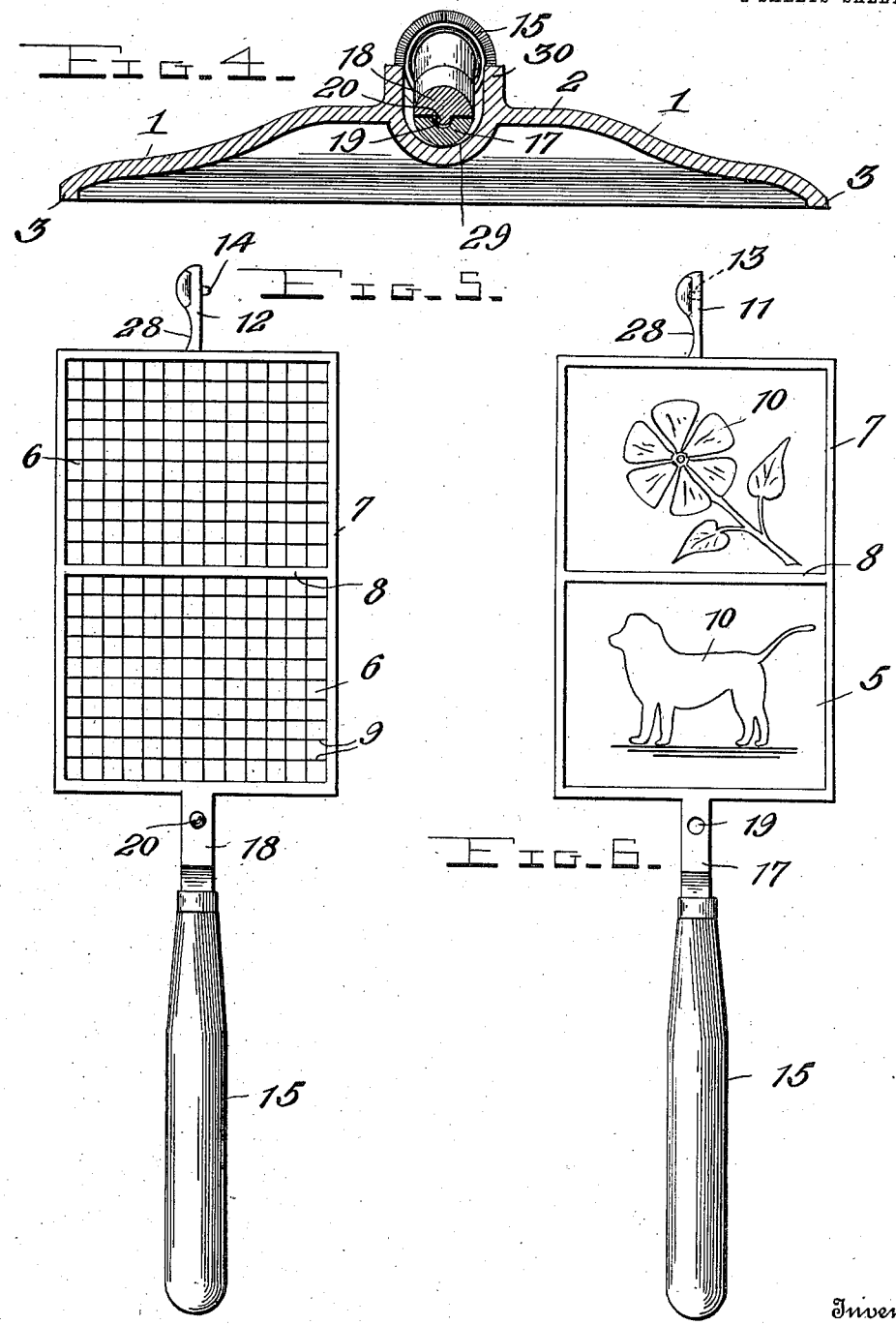

AUGUST C. BURKY, OF SHANESVILLE, OHIO.

PRETZEL-IRON.

1,034,581.

Specification of Letters Patent.  Patented Aug. 6, 1912.

Application filed July 16, 1910. Serial No. 572,245.

*To all whom it may concern:*

Be it known that I, AUGUST C. BURKY, a citizen of the United States, residing at Shanesville, in the county of Tuscarawas and State of Ohio, have invented certain new and useful Improvements in Pretzel-Irons, of which the following is a specification, reference being had to the accompanying drawings.

My invention is a device for baking cakes, commonly known as Swiss pretzels, and it consists of the novel construction, combination and arrangement of parts hereinafter fully described and claimed.

The object of the invention is to provide a baking device or iron adapted to be used on the top of a stove over a pot opening, and which may be conveniently handled so that the cakes or pretzels may be quickly and easily baked.

The above and other objects of the invention as will hereinafter appear are attained in the construction illustrated in the accompanying drawings in which:—

Figure 1 is a plan view of my Swiss pretzel iron; Fig. 2 is a vertical longitudinal section; Figs. 3 and 4 are detail sections taken respectively on the lines 3—3 and 4—4 in Fig. 1; and Figs. 5 and 6 are views of the two sections of the baking pan.

Referring more particularly to the drawing 1 denotes the body of the device which is preferably of circular form and of such size as to cover the usual stove lid opening in the top of a cooking stove or range. The body 1 has a raised, flat central portion 2 and a surrounding rim 3 which rests upon the stove top, said central portion being formed with a rectangular opening 4 in which is removably and rotatably arranged a baking pan consisting of two half sections or members 5, 6. The latter are in the form of rectangular metal plates provided with recessed inner opposing faces to contain the dough or batter from which the cakes or pretzels are made. These inner faces of the pan sections may be of any desired shape but as illustrated they are formed with a surrounding rim 7 and centrally arranged transverse ribs 8 which divide said plates into two portions so that two cakes may be simultaneously baked. The bottom of the pan 6 is formed with intersecting parallel grooves 9 to give the cakes a checkered surface on one side, and the bottom of the other pan section 5 may have depressions 10 arranged to form ornamental figures in order that the other side of the cakes may be molded with such figures. The pan sections or plates 5, 6, are detachably and pivotally united at one end by forming at said end integral hinge lugs 11, 12. These lugs are similar and have flat, opposing faces, in one of which is formed a central socket 13 to receive an integral pivot stud or lug 14 formed centrally on the flat face of the other lug. The pivot 14 is transversely disposed so that said pan sections may swing toward and from each other when a pair of handles 15 are properly manipulated. These handles extend longitudinally from the free ends of the pan sections 5, 6, and consist preferably of cylindrical wooden hand grips secured on the tapered and laterally offset extremities 16 of arms 17, 18, which are formed integral with and project longitudinally from the central portions of the end edges of the pan sections 5, 6. The arms 17, 18, have flat, opposing faces, and curved outer faces so that when they are brought together they form together a cylindrical trunnion for the said end of the pan. To keep the pan sections 5, 6, in engagement and prevent them from shifting laterally upon each other, the flat inner face of the arm 17 is formed with a socket 19 to receive an inwardly projecting lug or pin 20 formed integral with the flat face of the opposing arm 18. The hinge lugs 11, 12, have the outer faces of their inner portions curved so that together they form a second cylindrical trunnion for the pan, and the outer ends of said lugs 11, 12, are enlarged and made of substantially semispherical shape so that together they form a ball adapted to rest and rotate in a semispherical socket 21 provided on the base 1 at one end of the opening 4.

The socket 21 is formed in a cylindrical boss 22 which projects from one side of the base. The socket is circular in form and its bottom 26 is semi-spherical. At the upper end of the socket on the rear outer side thereof is a rib or flange 24, which partly overhangs the socket and is provided with a notch 24ª. At the inner side of the socket a vertical opening is formed in the boss, the sides of the said opening forming shoulders 27. The said shoulders 27 engage recesses 28 presented in the sides of the narrowed portions of the lugs 11, 12, so that while said shoulders 27 and recesses 28 permit the pan sections to be moved angularly in a vertical plane, with the lugs 11, 12, in the socket 22, and coact therewith to form a pivotal connection between the said pan sections and the base, the said shoulders 27 and outwardly enlarged portions of the said lugs coact, when the pan sections are in lowered position, to prevent casual detachment of the said pan sections from the base. The pan section which is uppermost can be turned vertically independently of the lower pan section so as to open one pan section from the other while leaving the lower section on the base, and when one of the sections has been thus raised, its hinge lug by engagement with the notch 24ª of the rib or flange 24 will support the said pan section in raised position. Each of the lugs 11, and 12, being substantially semi-spherical in form, and the socket 21 being shaped to receive the said lugs, the said lugs and the said socket coact to form in effect a ball and socket joint between the pan sections and the base. In order to separate the pan sections, they must first be turned so as to dispose the pivotal axes of the pivot 14 and socket 13 vertically and thus present the outer side of one of the lugs 11, 12, to the top of the recess 21, after which one of the pans may be lifted from the other, and its lug thus disengaged from the said socket or recess. The lugs 30 rise from opposite sides of the recess 29 and are disposed at opposite sides of the trunnion portions of the pan section handles when the pan sections are closed, and in lowered position.

To permit the device to be conveniently carried and lifted on to or off of the stove a bail handle 31 is preferably provided. This handle is formed from a heavy piece of wire and has its ends bent to form eyes 32 which engage apertured ears 33 formed integral with the raised top of the base on opposite sides of its opening 4.

In using the device the base is placed over a pot opening in the stove top after the lid has been removed from such opening, and the cake batter or dough is dropped upon the bottom of one of the pan sections while it is disposed in the opening 4 in the base, and while the other is supported in elevated position against the stop shoulder 24 and in the notch 24ª. The elevated pan section is then swung downwardly against the other to spread the cake batter or dough. After one side of the cake has been baked the pan is reversed in the opening 4 to bake the other side of the cake, or cakes.

It is to be particularly noted that the socket 21 is of a diameter equal to the greatest diameter of the combined lugs 11 and 12, whereby were it not for the transversely extending rib or shoulder 24, the pan sections 5 and 6 could be tilted up out of the opening in the body portion 1 by any pressure in a downward direction upon the handles 15. The rib 24, however, will prevent this accidental detachment of the hinge lugs 11 and 12 from the socket 21, should the cook casually press downwardly on the handles 15, while at the same time, said stop shoulder or lug 24 will in no wise prevent the pan sections from being entirely detached from the body portion 1 as soon as the handles 15 have been raised sufficiently to permit the substantially semi-cylindrical recessed shanks or necks of the lugs to move up from between the laterally spaced shoulders 27. The stop shoulder 24 not only serves this purpose, but as it is formed with the notch 24ª to one side of its middle, it also serves the purpose of holding the raised pan section in the dotted line position illustrated in Fig. 2, so that the other pan section may be supplied with the dough. With my construction, it is not necessary to form any projection on either hinge lug to abut against any part of the body portion to hold one pan section in the raised position illustrated in dotted lines in Fig. 2, the neck which is formed with the recess 28 serving this purpose as well as forming one-half of the trunnion upon which one end of the two pan sections is mounted to turn.

Having thus described the invention, what is claimed is:

The herein described cooking utensil, consisting of a base formed with an opening and with a boss at one side of said opening, said boss being formed with an upwardly opening socket, with laterally spaced shoulders at one side of said socket and with a transversely extending stop rib at the other side of said socket and overhanging the same, said rib being formed with a notch at one side of the middle of the rib, and pan sections provided at one end with complemental hinge lugs designed for pivotal connection with each other, said lugs together being adapted for insertion in said sockets and each lug being formed with a substantially semispherical recessed neck, the necks together being of a width substantially equal to the space between said shoulders and adapted to fit between said shoulders, the socket being of a diameter which opens upwardly in a space equal to the greatest diameter of the lugs and the said lugs being of such a length that when one pan section is raised and tilted over against the rib, the recessed neck of said lug will fit within said notch.

In testimony whereof I hereunto affix my signature in the presence of two witnesses.

AUGUST C. BURKY.

Witnesses:
   Geo. M. Deitz,
   Daniel E. Nickles.